United States Patent [19]
Achtstaetter

[11] 4,401,921
[45] Aug. 30, 1983

[54] MONOLITHIC INTEGRATED VERTICAL-DEFLECTION CIRCUIT FOR TELEVISION SETS WITH TANGENT-CORRECTED, LINE-FREQUENCY-DERIVED DIGITAL SIGNAL GENERATION

[75] Inventor: Gerhard Achtstaetter, Gundelfingen, Fed. Rep. of Germany

[73] Assignee: ITT Industries, Inc., New York, N.Y.

[21] Appl. No.: 326,638

[22] Filed: Dec. 2, 1981

[30] Foreign Application Priority Data
Dec. 8, 1980 [EP]  European Pat. Off. ........ 80107715.7
Jun. 16, 1981 [EP]  European Pat. Off. ........ 81104620.0

[51] Int. Cl.³ .................... H01J 29/70; H01J 29/72
[52] U.S. Cl. ................................................ 315/364
[58] Field of Search ............... 315/396, 397, 403, 364

[56] References Cited
U.S. PATENT DOCUMENTS
4,203,056  12/1982  Itoh .................................... 315/397

FOREIGN PATENT DOCUMENTS
2805691  8/1979  Fed. Rep. of Germany .

Primary Examiner—Theodore M. Blum
Attorney, Agent, or Firm—John T. O'Halloran; Peter C. Van Der Sluys

[57] ABSTRACT

A monolithic integrated vertical deflection circuit for television sets is provided for digital generation of the pulse width modulated signal for directly driving a vertical deflection stage. The integrated circuit is implemented using counters, clock generators, a frequency divider, a decoder and logic gates in conjunction with programmable read only memories so that the number of rows in a first programmable read only memory may be considerably reduced. Use of the simpler digital stages results in a chip of much smaller size than required by the prior art.

1 Claim, 1 Drawing Figure

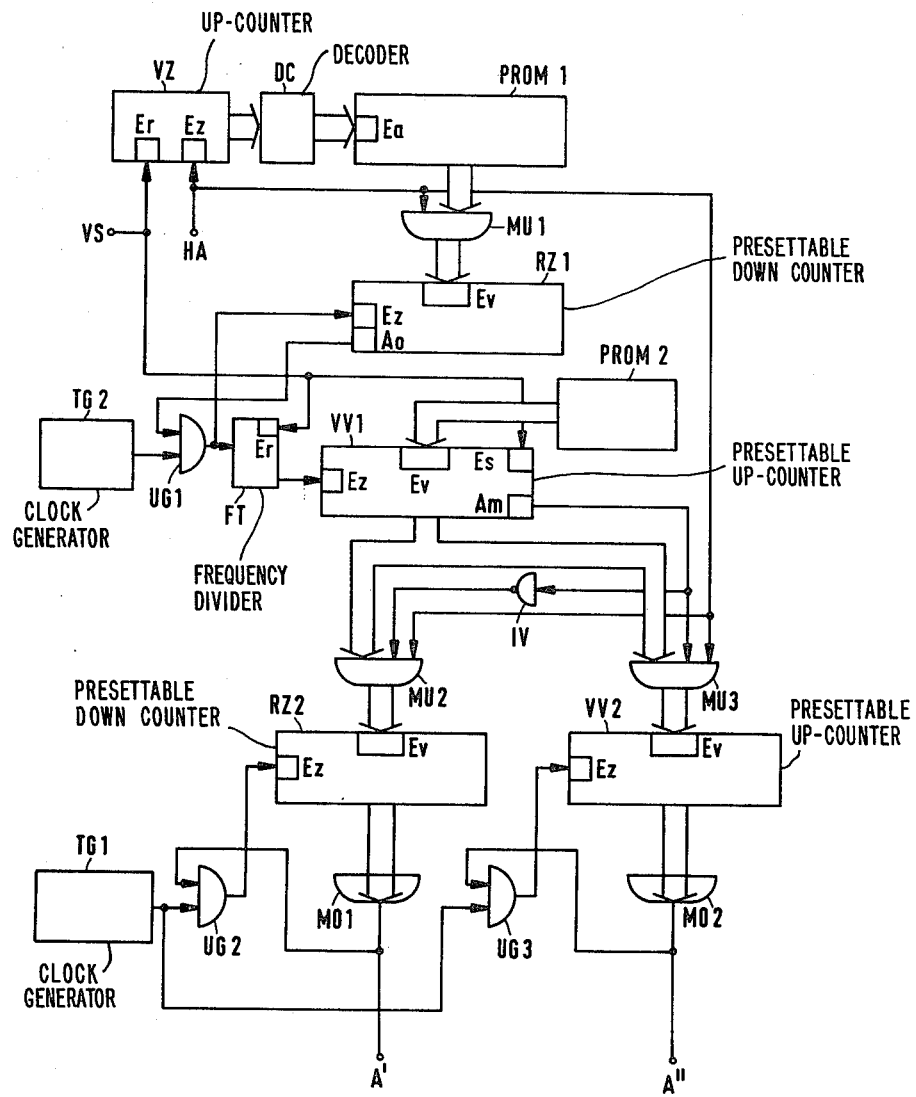

MONOLITHIC INTEGRATED VERTICAL-DEFLECTION CIRCUIT FOR TELEVISION SETS WITH TANGENT-CORRECTED, LINE-FREQUENCY-DERIVED DIGITAL SIGNAL GENERATION

The present invention relates to a monolithic integrated vertical-deflection circuit for television sets with tangent-corrected line-frequency-derived digital generation of the pulse-width-modulated signal for directly driving a class-D push-pull vertical-deflection stage, as is shown in FIG. 4 of DE-OS No. 28 05 691 and described there on pages 14 et seq., or for driving a class-B push-pull analog vertical-deflection stage via an integrator. The prior art vertical-deflection circuit contains an up-counter serving as an address generator for a first programmable read-only memory which holds digital words for every two adjacent lines. The arrangement further includes a second programmable read-only memory which holds a digital word corresponding to the deflection current at the top or bottom of the image, i.e., a so-called initial value. A first clock generator whose frequency is of the order of the color-subcarrier frequency, namely twice as high, is coupled to the count inputs of a first counter and a second counter, called "difference counters" there, and whose outputs provide the pulse-width-modulated drive signals for the upper and lower halves of the image.

The present invention is based on these subcircuits of the prior art arrangement. However, the prior art arrangement requires quite a number of additional subcircuits, such as a multiplexer, two adders, a so-called averaging stage comprising a comparator, an adder, a buffer member, and several logic gates, as well as a stage for forming twos complements, a pulse shaper, and a data-blocking device. The prior art arrangement is thus rather expensive.

This applies particularly to the first programmable read-only memory, whose number of rows must be at least equal to half the number of lines of a field, i.e., 156 rows in the case of the 625-line-standard system, for example.

The object of the invention as characterized in the claim is to provide a monolithic integrated vertical-deflection circuit for television sets which is considerably simpler in design than the prior art arrangement, requires a considerably reduced number of rows in the first programmable read-only memory in particular, and dispenses with the adders and the averaging stage of the prior art arrangement, i.e., the overall circuit is to be implemented with simpler digital stages.

The principal advantages of the invention are that only counters—this general term also covers the frequency divider used—, logic gates, and a decoder are necessary, and that a reduction of the number of rows of the first programmable read-only memory to about one fifth is achieved. Thus, a considerably smaller chip area is required, so that the integrated circuit can be formed on a chip much smaller than that required for the prior art arrangement. Another advantage is that fewer circuit types are necessary than with the prior art arrangement, namely only memories, counters and logic gates, so that with the basic elements characteristic of these individual circuit types, a more advantageous division of the chip area is possible. This advantage is based on the elimination of the multiplexer, the adders, and the comparators, which digital-circuit types are more complicated and costly than counters and logic gates.

The invention will now be explained in more detail with reference to the accompanying drawing, which is a block diagram of an embodiment of the invention.

The up-counter VZ corresponds to the line counter of the above-mentioned DE-OS (not shown there in FIG. 4, however) and performs the function of this line counter in the present invention. Its count input Ez is fed with horizontal-deflection pulses HA, which it counts until it is reset to zero by the vertical synchronizing pulses VS applied to its reset input Er. The up-counter VZ thus serves to "number" the lines of a field so that corresponding addresses for selecting the address inputs Ea of the first programmable read-only memory PROM 1 can be derived by means of the decoder DC.

According to the invention, this read-only memory holds only slope values which are obtained by approximating the S-shaped characteristic of the deflection-stage current by portions of constant slope. The storage of only these slope values results in the above-mentioned advantage of the considerable reduction in the number of rows of the first programmable read-only memory, for only 25–30 slope values need to be stored for the entire S-shaped characteristic of the deflection-stage current to obtain sufficient accuracy. These slope values can be adapted by the television-set manufacturer to the concrete characteristics of the picture tube used and of the associated deflection system, and they can be programmed into the first programmable read-only memory PROM1 by the television-set manufacturer at the factory.

This programming for presetting given values of a digital circuit is thus completely analogous to the known setting of values of analog circuits by means of variable capacitors, potentiometers or variometers.

Since, according to the invention, only slope values have to be stored, only a single address is necessary for all those lines of a field which lie in the linear portion of the deflection characteristic, so that the "number of lines" of the decoder DC is equal to that of the first programmable read-only memory PROM1; thus, the area requirement of the decoder is relatively small.

The contents of the addressed row are now transferred in parallel via the parallel output of the first programmable read-only memory PROM1 and the first multiple AND gate MU1 to the present input Ev of the first presettable down-counter RZ1 at the repetition rate of the horizontal deflection pulses HA. The first multiple AND gate MU1, indicated in the drawing by the logic symbol of an ordinary AND gate with a stripe-like input lead, combines each individual output lead with the lead carrying the horizontal deflection pulses HA. Thus, the multiple AND gate MU1 consists in reality of as many AND elements as there are leads connected to the parallel output of the first programmable read-only memory PROM1. The same applies analogously to the other multiple AND gates and multiple OR gates.

The count input Ez of the first presettable down-counter RZ1 is connected to the output of the first AND gate UG1, one input of which is connected to the output of the second clock generator TG2, and the other input of which is connected to the zero-state output AO of the first presettable down-counter RZ1. By "zero-state output" a wiring of the first presettable dow-counter RZ1 is to be understood which, when this counter passes through its zero state, provides a pulse whose level is assigned to the more positive level H of two binary-signal levels H, L in positive logic, which is assumed herein. This wiring is, for example, an OR gate which ORs all counts and, thus, provides the aforementioned H pulse only if all counts are at L level.

The frequency of the second clock generator TG2 must be chosen so that the first presettable down-counter RZ1 reaches its zero state within one line period after being set to the highest slope value. With the aforementioned 25 to 30 rows of the first programmable read-only memory PROM1 and in the 625-line-standard system, the frequency of the second clock generator TG2 is about 2 to 4 MHz.

The output of the first AND gate UG1 is coupled to the count input Ez of the first presettable up-counter VV1 via the frequency divider FT, whose reset input Er is presented with the vertical synchronizing pulses. This is necessary because at the end of a field, the frequency divider FT may be in a state other than the zero state; the zero state must be established via the reset input Er at the beginning of the next field.

On application of each vertical synchronizing pulse VS to its preset enable input Es, the first presettable down-counter VV1 is preset via the preset input Ev by means of the digital word in the second programmable read-only memory PROM2. This digital word corresponds to the deflection current at the top or bottom of the image and can be programmed as a digital value by the manufacturer of the television set.

The frequency divider FT makes it possible to reduce the count capacity of the first presettable up-counter VV1 and the frequency of the first clock generator TG1. It also permits the multiple AND gates MU2, MU3, the multiple OR gates MO1, MO2, and the counters RZ2, VV2 to be designed to process shorter digital words. For example, the capacity of the counter VV1, which, if no frequency divider were used, would be 15 bits, for example (with 8 bits for the first programmable read-only memory PROM1), can be reduced to 11 bits. Thus, the subcircuits MU2, MU3, MO1, MO2, RZ2 and VV2 have word lengths of 11 bits, too. Moreover, at such values, the frequency of the first clock generator TG1 would have to be 16 times as high if the frequency divider FT were not present, and this could not be implemented.

The count outputs of the first presettable up-counter VV1 are connected via the first input of the second multiple-AND gate MU2 to the preset parallel input Ev of the second presettable down-counter RZ2 and via the first input of the third multiple. AND gate MU3 to the reset parallel input Ev of the second presettable up-counter VV2. The second input of the multiple AND gates MU2, MU3 are fed with the horizontal deflection pulses HA, while the third input of the third multiple AND gate MU3 is connected to the output Am of the first presettable up-counter VV1 for the most significant bit, and the corresponding third input of the second multiple AND gate MU2 is fed with this output signal via the inverter IV. The most significant bit of the first presettable up-counter VV1 thus determines which of the two counters RZ2, VV2 is counting, i.e., this causes the picture to be divided into two halves.

The count inputs Ez of the two counters RZ2 and VV2 are connected to the output of the first clock generator TG1 via the first input-output paths of the second AND gate UG2 and the third AND gate UG3, respectively. The parallel outputs of the counters RZ2, VV2 are connected via the first multiple OR gate MO1 and the second multiple OR gate MO2 to the drive-signal outputs A' and A'', respectively, the outputs of these two multiple OR gates being also coupled to the second inputs of the second AND gate UG2 and the third AND gate UG3, respectively. Thus, when the counters RZ2, VV2 reach their zero states, the outputs of the following multiple OR gates MO1, MO2 provide an L level, which stops, via the associated AND gates UG2, UG3, the supply of further count pulses until the counters RZ2, VV2, are preset to a new value.

The arrangement is thus constructed so that if the drive-signal output A'' provides a pulse whose duration decreases with increasing number of lines, the duration of pulse appearing at the drive-signal output A' will increase as the number of lines continues to increase. These two pulses are suitable for driving a class-D push-pull vertical deflection stage as shown in the above-mentioned FIG. 4 of DE-OS No. 28 05 691, for example, or, via an integrator, a conventional class-B push-pull analog vertical-deflection stage.

The second presettable down-counter RZ2 and the second presettable up-counter VV2 correspond to the two difference counters shown in FIG. 4 of the prior art reference.

As the invention uses exclusively digital subcircuits, its circuit can be preferably implemented employing so-called MOSFET technology, i.e., integrated circuits using insulated-gate field-effect transistors, because this technology is better suited to implementing digital circuits than conventional bipolar technology.

If a class-A single-ended deflection stage is to be used instead of a class-D or class-B push-pull vertical-deflection stage, it is possible to dispense with the second presettable up-counter VV2 and the associated subcircuits, UG3, MO2, MO3 without departing from the basic idea of the invention.

I claim:

1. Monolithic integrated vertical-deflection circuit for television sets with tangent-corrected line-frequency-derived digital generation of the pulse-width-modulated signal for directly driving a class-D push-pull vertical-deflection stage or for driving a class-B push-pull analog vertical-deflection stage via an integrator and with an up-counter (VZ),
with a first programmable read-only memory (PROM1),
with a second programmable read-only memory (PROM2), which holds a digital word corresponding the deflection current at the top or bottom of the image,
with a first clock generator (TG1) whose frequency is on the order of the color-subcarrier frequency,
with a first counter which participates in the generation of the drive signal for the upper (or lower) half of the image, and
with a second counter which participates in the generation of the drive signal for the lower (or upper) half of the image, the count inputs of said first and second counters being coupled to the output of the first clock generator (TG1),
characterized by the following features:
the count input (Ez) and the reset input (Er) of the up-counter (VZ) are fed with the horizontal deflection pulses (HA) and the vertical synchronizing pulses (VS), respectively, and the count outputs of the up-counter (VZ) are connected to the address inputs (Ea) of the first programmable read-only memory (PROM1) via a decoder (DC);

the S-shaped characteristic of the deflection-stage current is approximated by portions of constant slope whose associated slope values are stored in the first programmable read-only memory (PROM1) under one address each;

the output of a second clock generator (TG2) is connected via one of the input-output paths of a first AND gate (UG1) to the count input (Ez) of a first presettable down-counter (RZ1), whose parallel preset input (Ev) is connected to the parallel output of the first programmable read-only memory (PROM1) via first input-output paths of a first multiple ANd gate (MU1), and whose zero-state output (AO) is coupled to the other input of the first AND gate (UG1), while the second inputs of the first multiple AND gate (MU1) are fed with the horizontal-deflection pulses (HA);

the output of the first AND gate (UG1) is connected via a frequency divider (FT) to the count input (Ez) of a first presettable up-counter (VV1) whose preset enable input (Es) is fed with the vertical synchronizing pulses (VS) and whose parallel preset input (Ev) is connected to the parallel input of the second programmable read-only memory (PROM2);

the output of the first clock generator (TG1) is connected via one of the input-output paths of a second AND gate (UG2) to the count input of a second presettable down-counter (RZ2) forming the first counter, and via one of the input-output paths of a third AND gate (UG3) to the count input of a second presettable up-counter (VV2) forming the second counter;

the count outputs of the first presettable up-counter (VV1) are connected to the parallel preset input (Ev) of the second presettable down-counter (RZ2) via first input-output paths of a second multiple AND gate (MU2);

the second inputs of the second multiple AND gate (MU2) are fed with the horizontal-deflection pulses (HA), and the third inputs of the second multiple AND gate (MU2) are connected to the output of an inverter (IV) having its input connected to the output (Am) of the first presettable up-counter (VV1) for the most significant bit;

the count outputs of the first presettable up-counter (VV1) are connected to the parallel preset input (Ev) of the second presettable up-counter (VV2) via first input-output paths of a third multiple AND gate (MU3);

the second inputs of the third multiple AND gate (MU3) are fed with the horizontal-deflection pulses (HA), and the third inputs of the third multiple AND gate (MU3) are connected to the output (Am) of the first presettable up-counter (VV1) for the most significant bit;

the count signals of the second presettable down-counter (RZ2) are connected via a first multiple OR gate (MO1) to the drive-signal output (A') for one half of the image, which output is also connected to the other input of the second AND gate (UG2);

the count outputs of the second presettable up-counter (VV2) are connected via a second multiple OR gate (MO2) to the drive-signal output (A'') for the other half of the image, which output is also connected to the other input of the third AND gate (UG3), and the frequency of the second clock generator (TG2) is chosen so that when the first presettable down-counter (RZ1) is set to the highest slope value, its zero state is reached within one line period.

* * * * *